United States Patent
Jung

(10) Patent No.: US 12,547,726 B2
(45) Date of Patent: Feb. 10, 2026

(54) BOOT CONTROLLER HAS TIGHTLY COUPLED SMART MEMORY (TCM) UNIT COMPRISING BOOT CODE ACCESSED BY ROM MEMORY UNIT FOR VERIFYING INTEGRITY OF BOOT CODE

(71) Applicant: Samsung Electronics Co., Ltd., Suwon-si (KR)

(72) Inventor: Eunyoung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 18/515,824

(22) Filed: Nov. 21, 2023

(65) Prior Publication Data
US 2024/0273210 A1    Aug. 15, 2024

(30) Foreign Application Priority Data
Feb. 14, 2023    (KR) .................... 10-2023-0019535

(51) Int. Cl.
*G06F 21/57*    (2013.01)
*G06F 13/28*    (2006.01)

(52) U.S. Cl.
CPC ............ *G06F 21/575* (2013.01); *G06F 13/28* (2013.01)

(58) Field of Classification Search
CPC ................................ G06F 13/28; G06F 21/575
See application file for complete search history.

(56) References Cited

U.S. PATENT DOCUMENTS

| | | | |
|---|---|---|---|
| 7,424,398 B2 * | 9/2008 | Booth | G06F 21/575 702/186 |
| 8,595,717 B2 | 11/2013 | Chang et al. | |
| 10,275,598 B2 | 4/2019 | Zimmer et al. | |
| 10,719,606 B2 | 7/2020 | Sanchez Diaz et al. | |
| 10,733,288 B2 * | 8/2020 | Jeansonne | G06F 21/575 |
| 11,194,913 B2 | 12/2021 | Gupta et al. | |
| 11,336,444 B2 | 5/2022 | Jeon et al. | |
| 11,347,863 B2 * | 5/2022 | Lin | G06F 21/575 |
| 2010/0174920 A1 * | 7/2010 | Buckingham | G06F 21/575 713/193 |
| 2019/0384918 A1 | 12/2019 | Ndu et al. | |
| 2021/0034733 A1 | 2/2021 | Grobelny et al. | |
| 2022/0121750 A1 | 4/2022 | Lee et al. | |
| 2022/0284104 A1 | 9/2022 | Herberholz et al. | |

FOREIGN PATENT DOCUMENTS

KR    102415005 B1    7/2022

* cited by examiner

*Primary Examiner* — Tammara R Peyton
(74) *Attorney, Agent, or Firm* — Wolf, Greenfield & Sacks, P.C.

(57) ABSTRACT

Provided are a boot controller and a computing device including the boot controller. After receiving a power-on-reset signal from the computing device, the boot controller verifies the integrity of boot code stored in read only memory (ROM) of the computing device by reading the boot code from the ROM, and determines a boot mode of the computing device based on results of the verification of the integrity of the boot code stored in the ROM.

20 Claims, 8 Drawing Sheets

BOOT CONTROLLER HAS TIGHTLY COUPLED SMART MEMORY (TCM) UNIT COMPRISING BOOT CODE ACCESSED BY ROM MEMORY UNIT FOR VERIFYING INTEGRITY OF BOOT CODE

CROSS-REFERENCE TO RELATED APPLICATION

This application is based on and claims priority under 35 U.S.C. § 119 to Korean Patent Application No. 10-2023-0019535, filed on Feb. 14, 2023, in the Korean Intellectual Property Office, the disclosure of which is incorporated by reference herein in its entirety.

The inventive concept relates to a boot controller, a computing device including the boot controller, a method of verifying the integrity of a boot program running on the computing device, and a secure boot method performed by the computing device.

BACKGROUND

In general, during the operations of devices, a boot time may be important in terms of security. It may be important to verify the integrity of execution code during booting. Many attackers may try to modify software while devices are in a power-off state.

Secure boot refers to a system boot method used to ensure the integrity of software such as an operating system (OS), firmware, and applications. For example, secure boot may be used to protect firmware installed in a computing device by booting only untainted firmware.

SUMMARY

The inventive concept, as implemented by embodiments described herein, provides a secure boot technique for increasing or ensuring the reliability of a boot program by verifying the integrity of the boot program in a computing device.

According to an aspect of the inventive concept, there is provided a boot controller configured to receive a power-on-reset signal from a device, generate a verification result indicating the integrity of boot code stored in read only memory (ROM) provided in the device by reading the boot code from the ROM, and determine a boot mode of the device based on the verification results indicating the integrity of the boot code stored in the ROM.

According to another aspect of the inventive concept, there is provided a computing device. The computing device includes a processor core configured to execute program code, ROM storing boot code configured to be used for booting by the processor core, and a boot controller configured to receive a power-on-reset signal, generate a check log by reading the boot code from the ROM and verifying the integrity of the boot code stored in the ROM, output a core reset signal configured to wake up the processor core, and output a boot mode value determined based on the check log to the processor core.

According to another aspect of the inventive concept, there is provided a method of verifying integrity of a boot program for a computing device. The method includes performing, by a boot controller, operations comprising: receiving a power-on-reset signal; generating a check log by verifying the integrity of the boot program based on an expected value previously stored in a secure memory; and outputting a core reset signal configured to wake up a processor core and a boot mode value determined based on the check log.

According to another aspect of the inventive concept, there is provided a secure boot method for a computing device. The secure boot method includes receiving a power-on-reset signal at a boot controller of the computing device; generating, by the boot controller, a check log by verifying integrity of a boot program based on an expected value previously stored in a secure memory; outputting, from the boot controller, a core reset signal configured to wake up a processor core of the computing device and a boot mode value determined based on the check log, waking up the processor core responsive to the core reset signal, and booting the computing device based on the boot mode value by the processor core.

BRIEF DESCRIPTION OF THE DRAWINGS

Embodiments will be more clearly understood from the following detailed description taken in conjunction with the accompanying drawings in which.

DETAILED DESCRIPTION OF EMBODIMENTS

Figure 1:
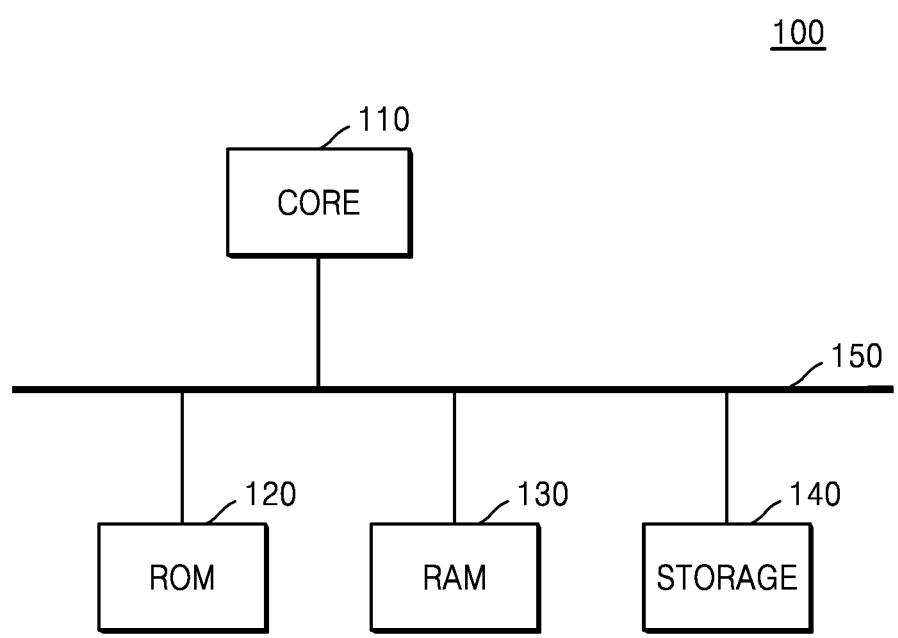
FIG. 1 is a block diagram illustrating an example of a computing device.

FIG. 1 is a block diagram illustrating an example of a computing device 100.

The computing device 100 may be implemented as a personal computer (PC), a laptop computer, a mobile phone, a smartphone, a tablet PC, a personal digital assistant (PDA), an enterprise digital assistant (EDA), a digital camera, a portable multimedia player (PMP), a portable navigation device (PND), an MP3 player, an e-book, or the like The computing device 100 may include a processor core 110, read only memory (ROM) 120, random access memory (RAM) 130, and a storage 140.

The processor core 110 may execute an operating system (OS) stored or resident in the ROM 120 or the RAM 130. The processor core 110 may execute and control programs stored in the ROM 120 or the storage 140. The processor core 110 may control some or all operations of the computing device 100. Although FIG. 1 illustrates that the processor core 110 is of a single core type, the processor core 110 may include one of any number and/or types of processing cores that may be configured in any manner (for example, a heterogeneous multi-core application processor). The term "and/or" includes any and all combinations of one or more of the associated listed items. In various embodiments, the processor core 110 may be implemented as a core of a microcontroller, an embedded controller, or a digital signal processor. The terms "comprises," "comprising," "includes" and/or "including," when used herein, specify the presence of stated elements, but do not preclude the presence of additional elements.

The ROM 120 may store data required to boot the computing device 100. The ROM 120 may store boot code to be used for booting by the processor core 110.

The RAM 130 may be used as a main memory or cache memory of the computing device 100 or may temporarily store data to be provided to the storage 140. For example, the RAM 130 may include dynamic random access memory (DRAM) such as synchronous DRAM (SDRAM), double data rate SDRAM (DDR SDRAM), low power double data rate SDRAM (LPDDR SDRAM), graphics double data rate SDRAM (GDDR SDRAM), DDR2 SDRAM, DDR3 SDRAM, and DDR4 SDRAM; static random access memory (SRAM); cache memory; and/or tightly coupled memory (TCM).

The storage 140 may be a non-volatile data storage medium allowing electrical writing and erasing of data. The storage 140 may include a solid state drive (SSD), a flash memory card, a multimedia card (MMC), a universal serial bus (USB) flash drive, a SmartMedia card, a compact flash, a memory stick, a secure digital (SD) card, a universal flash storage (UFS), and/or a compute express link (CXL).

The storage 140 may store various types of digital data. For example, the storage 140 may store an OS for basic operations of the computing device 100, applications that are to be run on the OS and correspond to various functions, and various types of content such as images and audio files that are to be processed or executed by the applications. These types of data are stored in the storage 140 while power is not applied to the computing device 100. As the computing device 100 boots, the OS is loaded into the RAM 130 and operated, and the applications and the content are loaded into the RAM 130 and executed according to various events.

A bus 150 may connect the processor core 110, the ROM 120, the RAM 130, and the storage 140 to each other. The bus 150 may include a communication infrastructure that enables interaction between various components of the computing device 100. For example, the bus 150 may transfer data between components of the computing device 100, for example, between the processor core 110 and the RAM 130. The bus 150 may include a wireless and/or wired communication medium between components of the computing device 100 and may include parallel, serial, or other topological arrangements.

Figure 2:
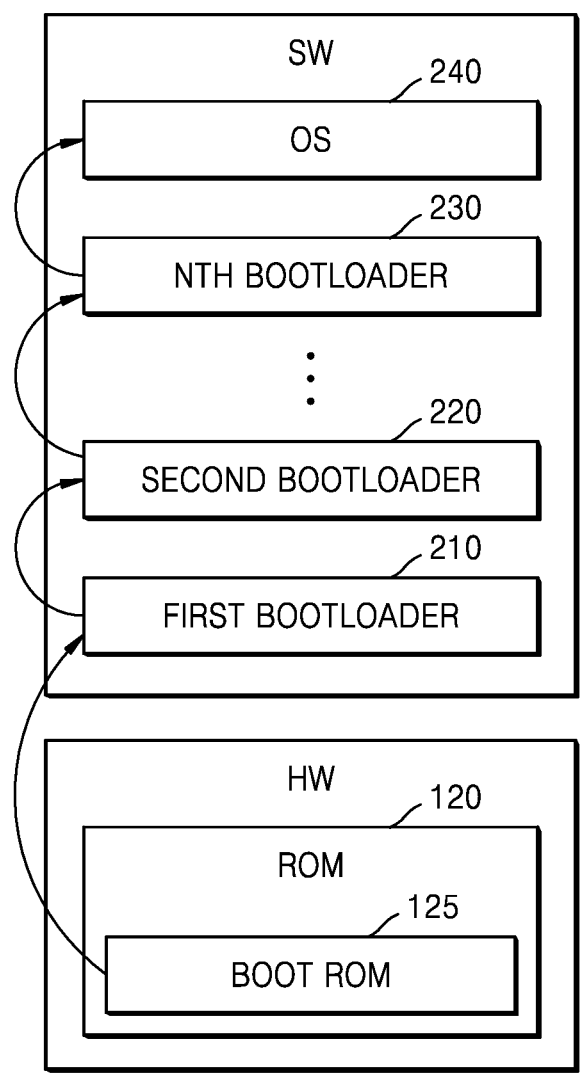
FIG. 2 is a block diagram illustrating a boot configuration of the computing device according to a comparative example.

FIG. 2 is a block diagram illustrating a boot configuration of the computing device 100 according to a comparative example.

The computing device 100 may boot. When power is applied to the computing device 100, the computing device 100 may execute the boot code to configure resources of the computing device 100. Once the resources and components are configured, the OS may be loaded and executed by the boot code. Thereafter, control of the computing device 100 may be transferred to the OS that operates to implement functions or applications of the computing device 100.

In the present disclosure, the term "booting" may refer to an operation of reading an OS stored in a computer readable storage medium and preparing a computing device for performing functions when the computing device is powered or reset.

Booting may be initiated by an event such as supplying power to the computing device 100 or resetting the computing device 100. When an event such as powering or resetting occurs, the computing device 100 may generate a reset signal (hereinafter, referred to as a power-on-reset (POR) signal).

Referring to FIGS. 1 and 2, the boot code may be executed in hardware (HW) and software (SW) of the computing device 100 during a boot process. The HW may include the ROM 120, and the binary of the boot code may be burned into or permanently written to the ROM 120 during the manufacture of the ROM 120. ROM (hereinafter, referred to as boot ROM 125) in which the boot code is stored is executed to initiate the boot process of the computing device 100. In general, the boot ROM 125 is burned into the ROM 120 and is not modifiable, and execution of the boot ROM 125 may guarantee a reliable boot process. Here, the boot ROM 125 may function as a "root of trust."

When power is applied to the computing device 100, the processor core 110 may receive a POR signal and read the boot code from the boot ROM 125. For example, the processor core 110 may control the computing device 100 to load the boot code of the boot ROM 125 into the RAM 130 through the bus 150. When the boot ROM 125 is executed during a boot sequence, a higher level boot loader is loaded into the SW, and the SW also loads another higher level boot loader. In this manner, the boot sequence continues until an OS 240 is loaded.

When the boot ROM 125 is executed, a first boot loader 210 is loaded from the storage 140. Once control of resources is passed from the boot ROM 125 to the first bootloader 210, the first bootloader 210 is executed to configure the resources of the computing device 100 and a second bootloader 220 is loaded from the storage 140. The terms "first," "second," etc., may be used herein merely to distinguish one component or element from another. The boot sequence may be performed through one or more intermediate boot loaders. The boot sequence may continue until an Nth bootloader 230 is loaded and executed. For the reliability of the boot process, the authentication of each piece of level boot code or each boot loader may be verified by the previous level boot loader.

Finally, when the Nth bootloader 230 is executed and the OS 240 is loaded from the storage 140, the boot sequence may end.

In this manner, the computing device 100 may boot software in a plurality of steps according to functions and purposes.

In general, during operations of the computing device 100, the boot time may be important in terms of security. Many attackers may try to modify software while devices are in a power-off state. Thus, the integrity of boot execution code may be verified during booting.

The following items (a non-exhaustive list) may be considered to verify the integrity of boot execution code. For example, it may be necessary to verify the integrity of boot code stored in ROM. Because the ROM in which the boot code is stored is of a read only type, the risk of the boot code being tampered with may be relatively low. In some cases, however, the boot code may contain errors, and thus, the boot code may be patched to correct the errors. Therefore, the integrity of the boot code stored in the ROM may be verified to detect errors in the boot code or malicious code inserted into the boot code during a boot code patching process. Also, because firmware that operates the processor core 110 is at risk of being tampered with due to attacks such as hacking, the processor core 110 may not be involved in verifying the integrity of a boot program.

Secure boot refers to a system boot method used to ensure the integrity of software such as an OS, firmware, and applications. Firmware installed in a device may be protected by booting only untainted firmware through secure boot. Secure boot may refer to a technique of rejecting booting when firmware is modified in an unintended form.

A computing device 300 and a secure boot method in accordance with some embodiments will now be described.

Figure 3A:
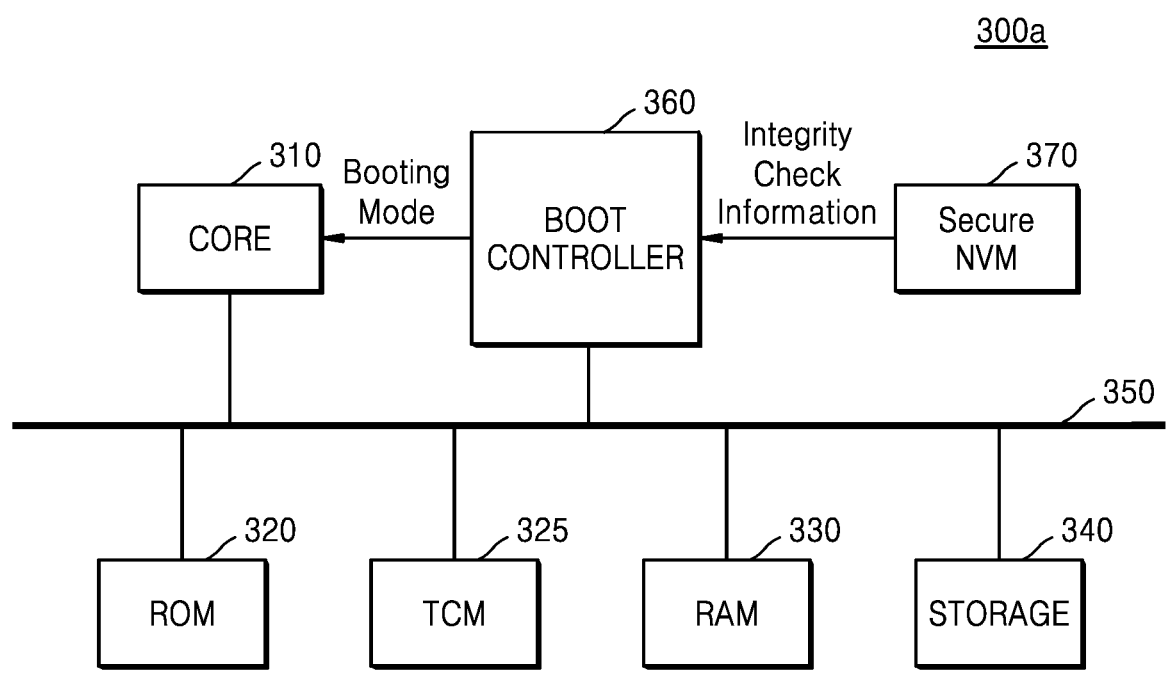
FIGS. 3A and 3B are block diagrams illustrating a computing device according to embodiments.
Figure 3B:
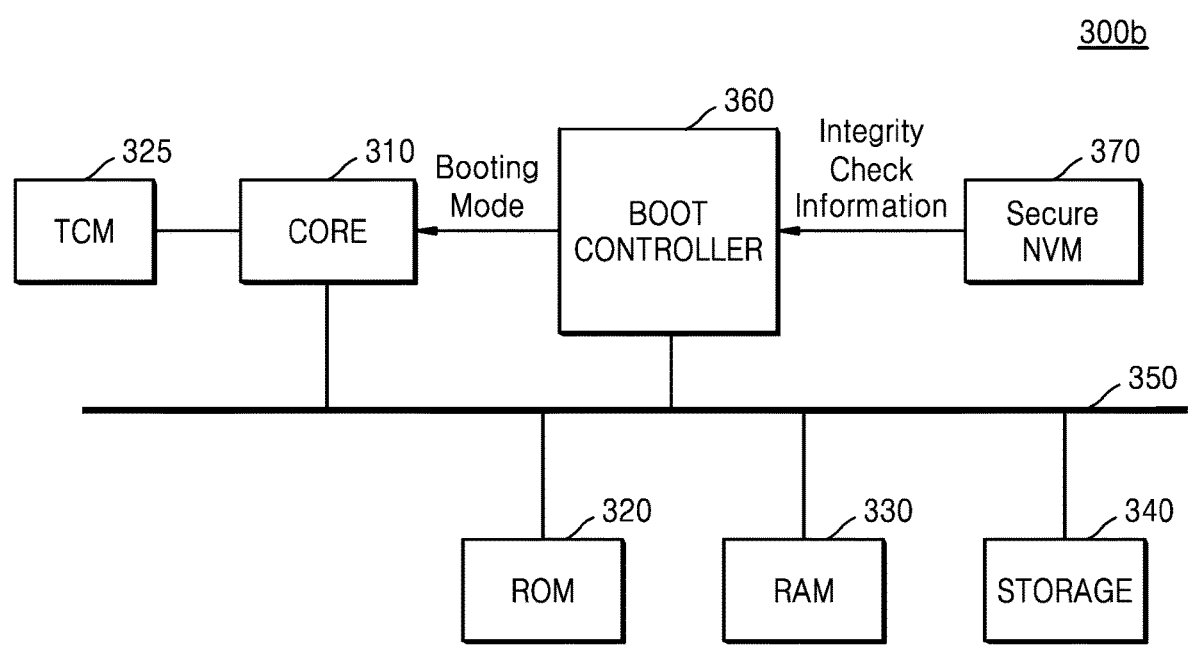

FIGS. 3A and 3B are block diagrams illustrating computing devices 300a, 300b (generally referred to as computing device 300) according to embodiments.

According to the embodiments, the computing device 300 may include a processor core 310, ROM 320, a TCM 325, RAM 330, a storage 340, a boot controller 360, and a secure memory 370.

Configurations of the computing device 300 shown in FIGS. 3A and 3B are the same except for the connection of the TCM 325 to the processor core 310. FIG. 3A illustrates that the TCM 325 is connected to the processor core 310 through a bus 350, and FIG. 3B illustrates that the TCM 325 is directly connected to the processor core 310 without involving the bus 350.

The processor core 310 may control some or all operations of the computing device 300. The processor core 310 may execute an operating program stored or resident in the ROM 320, the RAM 330, or the storage 340. The processor core 310 may execute program code or one or more instructions stored in memory. The processor core 310 may include hardware components that perform arithmetic, logic, and input/output operations, and signal processing. For example, the processor core 310 may include a central processing unit, a microprocessor, a graphics processing unit, an application processor, an application specific integrated circuit (ASIC), a digital signal processor (DSP), a digital signal processing device (DSPD), a programmable logic device (PLD), and/or a field programmable gate array (FPGA). However, the processor core 310 is not limited thereto.

Data used for booting the computing device 300 may be stored in the ROM 320. That is, boot code used by the processor core 310 for booting may be stored in the ROM 320. As the boot code stored in the ROM 320 is executed through the processor core 310, a boot loader may be executed, and as the boot loader is executed, an OS may be operated. In this manner, the computing device 300 may be booted.

The TCM 325 is a memory that stores frequently used code for high-speed data operations. The boot code stored in the ROM 320 may be copied and stored in the TCM 325. In an embodiment, the TCM 325 may be connected to the processor core 310 through the bus 350, as shown in FIG. 3A. In another embodiment, the TCM 325 may be directly connected to the processor core 310 without involving the bus 350, as shown in FIG. 3B.

The RAM 330 may be used as a main memory or cache memory of the computing device 300 or may temporarily store data to be provided to the storage 340.

The storage 340 may store various types of digital data. For example, the storage 340 may store an OS for basic operations of the computing device 300, applications that are to be run on the OS and correspond to various functions, and various types of content such as images and audio files that are to be processed or executed by the applications. These types of data may be stored in the storage 340 while power is not applied to the computing device 300. As the computing device 300 boots, the OS may be loaded into the RAM 330 and operated, and the applications and the content may be loaded into the RAM 330 and executed according to various events.

The boot controller 360 may verify the integrity of a boot program executed on the computing device 300. The boot program may also be referred to as or with reference to boot code, a boot loader, and the like. The boot controller 360 may read integrity check information from the secure memory 370 to verify the integrity of the boot program.

When a POR signal is generated in the computing device 300, the boot controller 360 wakes up by or responsive to receiving the POR signal. As used herein, the term "wake up" may refer to exiting a suspend or sleep state, or otherwise returning to an active computing state. The boot controller 360 may generate a check log by verifying the integrity of the boot program. The boot controller 360 may determine a boot mode of the computing device 300 based on the check log. The boot controller 360 may output a core reset signal for waking up the processor core 310 and a boot mode value to the processor core 310. The check log may have a value of 1 when the integrity of the boot program is confirmed and may have a value of 0 when the boot program is erroneous or tampered with. When the check log has a value of 1, the boot mode may be determined as a PASS mode. When the check log has a value of 0, the boot mode may be determined as a FAIL mode.

The processor core 310 wakes up by or responsive to receiving a core reset signal from the boot controller 360. Firmware that operates the processor core 310 is at risk of being tampered with due to attacks such as hacking. Thus, the processor core 310 may not be involved in verifying the integrity of the boot program. In an embodiment, the processor core 310 wakes up by receiving a core reset signal output from the boot controller 360 rather than immediately waking up when a POR signal is generated in the computing device 300. Because the boot controller 360 outputs a core reset signal after verifying the integrity of the boot program, the processor core 310 is not involved in determining the integrity of the boot program. When the processor core 310 receives the PASS mode, the processor core 310 may boot the computing device 300 through the boot process described with reference to FIG. 2. When the processor core 310 receives the FAIL mode, the processor core 310 may not boot the computing device 300.

The secure memory 370 may include a non-volatile memory such as a flash memory, the ROM 320, or a one-time programmable (OTP) memory. The secure memory 370 may previously store integrity check information used for verifying the integrity of the boot program. The integrity check information for verifying the integrity of the boot program may be stored in ranges of the secure memory 370.

The bus 350 may connect the processor core 310, the TCM 325, the ROM 320, the RAM 330, the storage 340, and the boot controller 360 to each other. The bus 350 may include a communication infrastructure that enables interaction between various components of the computing device 300. For example, the bus 350 may transfer data between components of the computing device 300. The bus 350 may include a wireless and/or wired communication medium between components of the computing device 300 and may include parallel, serial, or other topological arrangements.

Figure 4:
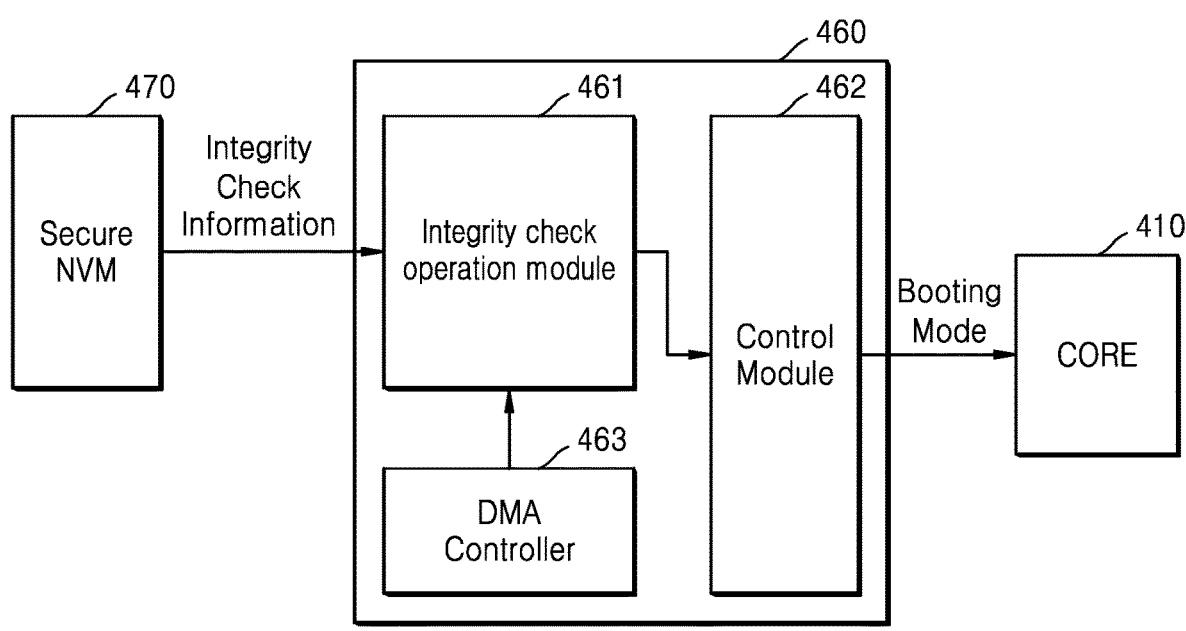
FIG. 4 is a block diagram illustrating a boot controller according to an embodiment.

FIG. 4 is a block diagram illustrating a boot controller 460 according to an embodiment.

The boot controller 460 includes an integrity check module 461, a control module 462, and a direct memory access (DMA) controller 463.

The integrity check module 461 may read integrity check information from a secure memory 470. The integrity check module 461 may verify the integrity of a boot program based on the integrity check information. The boot program may also be referred to as or with reference to boot code, a boot loader, and the like.

The integrity check module 461 may verify the integrity of the boot code stored in ROM. Because the ROM in which the boot code is stored is of a read only type, the risk of the boot code being tampered with is relatively low. However, the boot code may sometimes contain errors. In some cases, the boot code may be patched to correct such errors. Therefore, the integrity of the boot code stored in the ROM may be verified to detect errors in the boot code or malicious code inserted into the boot code during a boot code patching process.

The integrity check module 461 may generate a hash value (or digest) of the boot code by using a hash algorithm. The hash value is a unique value determined in a one-to-one matching manner according to original data, that is, the boot code. The integrity check module 461 has an algorithm for converting original boot code into a specific unique hash value. The hash algorithm is designed such that a third party may not recover original boot code from a hash value and may not find different data from the same output.

The integrity check module 461 may verify the integrity of the boot code stored in the ROM by comparing a first expected value stored in the secure memory 470 with the hash value of the boot code. When the first expected value stored in the secure memory 470 and the hash value of the boot code match each other, the integrity check module 461 determines that the boot code stored in the ROM is intact. When the first expected value stored in the secure memory 470 and the hash value of the boot code do not match each other, the integrity check module 461 determines that the boot code stored in the ROM is defective. The first expected value is a hash value previously calculated for the boot code stored in the ROM.

The integrity check module 461 may verify the integrity of boot code stored in a TCM. The TCM is a memory used to store frequently used code for high-speed data operations, and the boot code stored in ROM may be copied and stored in the TCM. In an embodiment, data may be stored in the TCM by copying a portion of the boot code stored in the ROM instead of copying all of the boot code stored in the ROM. In another embodiment, the TCM may store data including all of the boot code stored in the ROM. The integrity check module 461 may verify the integrity of code stored in the TCM by comparing a second expected value stored in the secure memory 470 with a hash value of the code stored in the TCM. The second expected value is a hash value previously calculated for a range of the boot code stored in the ROM that is copied to the TCM.

The integrity check module 461 may verify the integrity of a bootloader temporarily stored in RAM. The integrity check module 461 may compare a third expected value stored in the secure memory 470 with a hash value of the bootloader temporarily stored in the RAM to verify the integrity of the bootloader stored in the RAM. The third expected value is a hash value previously stored for the bootloader stored in the RAM.

The control module 462 may generate and store a check log for integrity verification results received from the integrity check module 461. The control module 462 may generate a first check log for results of verification of the integrity of the boot code stored in the ROM. The control module 462 may generate a second check log for results of verification of the integrity of the code stored in the TCM. The control module 462 may generate a third check log for results of verification of the integrity of the bootloader temporarily stored in the RAM. The first to third check logs may each have a value of 0 or 1. For example, the first to third check logs may have a value of 1 when integrity is confirmed and a value of 0 when a flaw in integrity is confirmed.

The control module 462 may determine a boot mode of the computing device 300 based on the first to third check logs. For example, the control module 462 may determine the boot mode as a FAIL mode when any one of the first to third check logs has a value of 0. The control module 462 may determine the boot mode as a PASS mode when the first to third check logs each have a value of 1. However, this is only an example, and conditions for determining the boot mode of the computing device 300 may be variously changed. For example, the boot mode may be determined as the FAIL mode only when the first check log has a value of 0, or the boot mode may be determined as the FAIL mode only when any one of the first to third check logs has a value of 0.

When receiving the PASS mode from the control module 462 of the boot controller 460, the processor core 310 of the computing device 300 may boot the computing device 300 through the boot process described with reference to FIG. 2. The processor core 310 may not boot the computing device 300 when receiving or determining the FAIL mode.

The DMA controller 463 may transmit the boot program to the integrity check module 461 by directly accessing the ROM 320, the TCM 325, the RAM 330, and the storage 340. The DMA controller 463 may transmit data stored in the ROM 320, the TCM 325, the RAM 330, and the storage 340 to the integrity check module 461 without involving the processor core 310. Therefore, the boot controller 460 may verify the integrity of the boot program without involving the processor core 310.

Figure 5:
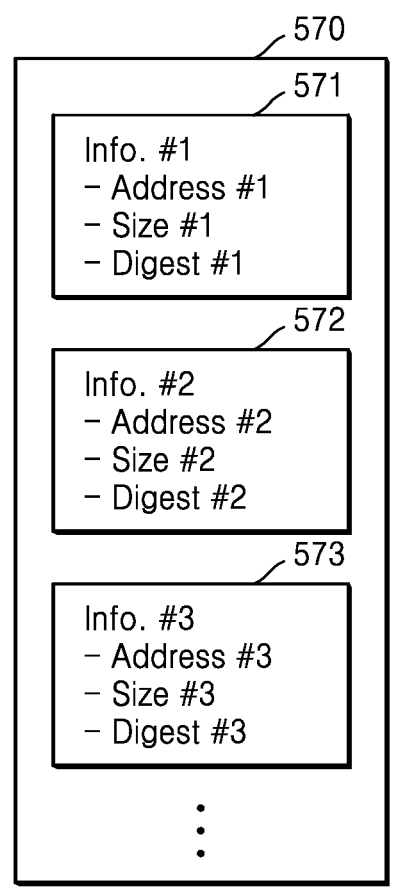
FIG. 5 is a block diagram illustrating a configuration of a secure memory according to an embodiment.

FIG. 5 is a block diagram illustrating a configuration of a secure memory 570 according to an embodiment.

The secure memory 570 may include a non-volatile memory such as flash memory, ROM, or OTP memory. The secure memory 570 may previously store integrity check information for verifying the integrity of a boot program. The integrity check information stored in the secure memory 570 may be transmitted to a boot controller. The integrity check information for verifying the integrity of a boot program may be stored in ranges of the secure memory 570.

Information about a first expected value may be stored in a first range 571. For example, the address and size of boot code stored in ROM and the first expected value may be stored in the first range 571. The first expected value is a hash value (or digest) previously calculated for the boot code stored in the ROM.

Information about a second expected value may be stored in a second range 572. For example, the second range 572 may store the address of a boot code range copied from the ROM to a TCM, the size of the boot code range copied from the ROM to the TCM, and the second expected value. The second expected value is a hash value (or digest) previously calculated for the boot code range copied from the ROM to the TCM.

Information about a third expected value may be stored in a third range 573. For example, the address of a bootloader stored in RAM, the size of the bootloader, and the third expected value may be stored in the third range 573. The third expected value is a hash value (or digest) previously calculated for the bootloader.

Figure 6:
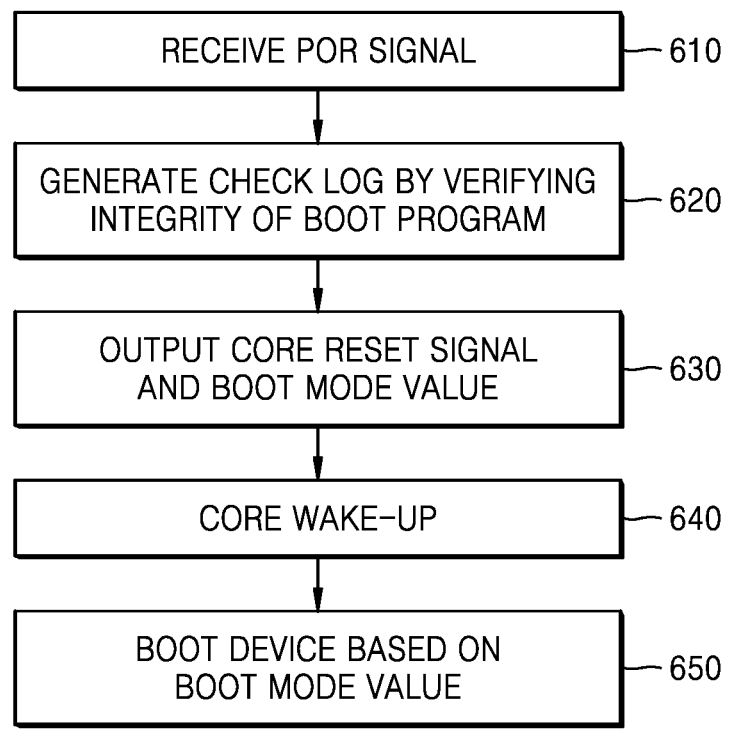
FIG. 6 is a flowchart illustrating a secure boot method performed by a computing device according to an embodiment.
Figure 7:
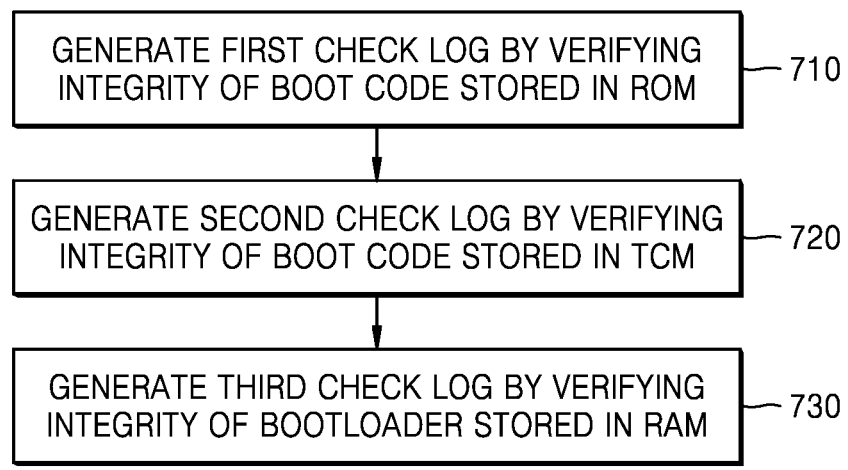
FIG. 7 is a flowchart illustrating a method of generating check logs by verifying the integrity of a boot program, according to an embodiment.

FIG. 6 is a flowchart illustrating a secure boot method performed by a computing device according to an embodiment. FIG. 7 is a flowchart illustrating a method of generating check logs by verifying the integrity of a boot program, according to an embodiment.

Referring to FIGS. 3A and 3B and 5 to 7, according to an embodiment, the secure boot method performed by a computing device may include: receiving a POR signal (operation 610); generating a check log by verifying the integrity of a boot program (operation 620); outputting a core reset signal for waking up a processor core and outputting a boot mode value determined based on the check log (operation 630); allowing the processor core to wake up (operation 640) responsive to the core reset signal (rather than responsive to the POR signal); and booting a device based on the boot mode value by the processor core (operation 650), that is, selectively booting the device depending on the boot mode value.

A POR signal may be generated by an event such as powering or resetting the computing device 300. When the POR signal is generated in the computing device 300, the boot controller 360 may wake up by or responsive to receiving the POR signal (operation 610).

The boot controller 360 may generate a check log by reading integrity check information from the secure memory 370 and verifying the integrity of a boot program running on the computing device 300 (operation 620).

Operation 620 of generating a check log may include: generating a first check log by comparing a first expected value previously stored in the secure memory 370 with a hash value of boot code stored in the ROM 320 (operation 710); generating a second check log by comparing a second expected value previously stored in the secure memory 370 with a hash value of code stored in the TCM 325 (operation 720); generating a third check log by comparing a third expected value previously stored in the secure memory 370 with a hash value of a bootloader stored in the RAM 330 (operation 730).

The boot controller 360 may determine the boot mode of the computing device 300 based on the check log and may output a core reset signal for waking up the processor core 310 and a boot mode value to the processor core 310 (operation 630).

The processor core 310 may wake up by or responsive to receiving the core reset signal from the boot controller 360 (operation 640), rather than responsive to receiving the POR signal.

The processor core 310 may selectively boot the computing device 300 based on the boot mode value output by the boot controller 360 (operation 650). When the processor core 310 receives a PASS mode, the processor core 310 may boot the computing device 300 through the boot process described with reference to FIG. 2. When the processor core 310 receives a FAIL mode, the processor core 310 may not boot the computing device 300.

As described above, various embodiments provide a secure boot technique for increasing or guaranteeing the reliability of a boot program by verifying the integrity of the boot program in a computing device. In addition, the integrity of boot code stored in ROM may be verified. In addition, results obtained by checking the integrity of the boot program may be reliable because the integrity of the boot program is determined without involving a processor core (e.g., before wake up of the processor core), such that the processor core is shielded from executing boot code that may have been modified by an attacker.

While the inventive concept has been particularly shown and described with reference to embodiments thereof, it will be understood that various changes in form and details may be made therein without departing from the scope of the following claims.

What is claimed is:

1. A computing device, comprising:
a boot controller configured to:
receive a power-on-reset signal, generate a verification result indicating integrity of boot code stored in read only memory (ROM) by reading the boot code from the ROM responsive to the power-on-reset signal, and
determine a boot mode based on the verification result indicating the integrity of the boot code stored in the ROM,
wherein, responsive to receiving the power-on-reset signal, the boot controller is configured to generate a check log by reading the boot code from the ROM and verifying integrity of the boot code stored in the ROM, output a core reset signal that is configured to wake up a processor core, and output a boot mode value determined based on the check log to the processor core.

2. The computing device of claim 1, wherein the boot controller comprises an integrity check module configured to verify the integrity of the boot code stored in the ROM by comparing an expected value of the boot code previously stored in a secure memory with a hash value of the boot code stored in the ROM.

3. The computing device of claim 2, wherein the secure memory comprises a non-volatile memory.

4. The computing device of claim 1, wherein the boot controller comprises a direct memory access (DMA) controller configured to read the boot code from the ROM.

5. The computing device of claim 1, further comprising:
the processor core configured to execute program code; and
the ROM storing the boot code, and
wherein the processor core is configured to use the boot code for booting the computing device.

6. The computing device of claim 5, wherein the check log comprises a first check log, and wherein the boot controller comprises an integrity check module configured to generate the first check log by comparing a first expected value previously stored in a secure memory with a hash value of the boot code stored in the ROM.

7. The computing device of claim 6, wherein the secure memory is configured to store an address, a size, and a hash value of the boot code in a first range of the secure memory.

8. The computing device of claim 5, wherein the boot controller comprises a direct memory access (DMA) controller configured to read the boot code from the ROM.

9. The computing device of claim 5, wherein the check log comprises a second check log, and further comprising:
a tightly coupled memory (TCM) configured to store at least a portion of the boot code stored in the ROM;
wherein the boot controller comprises an integrity check module configured to generate the second check log by comparing a second expected value previously stored in a secure memory with a hash value of code stored in the TCM.

10. The computing device of claim 9, wherein the secure memory is configured to store, in a second range of the secure memory, an address of a range copied from the boot code to the TCM, a size of the range copied from the boot code to the TCM, and a hash value of the range copied from the boot code to the TCM.

11. The computing device of claim 5, wherein the check log comprises a third check log, and further comprising:
 random access memory (RAM) configured to temporarily store a boot loader,
 wherein the boot controller comprises an integrity check module configured to generate the third check log by comparing a third expected value previously stored in a secure memory with a hash value of the boot loader temporarily stored in the RAM.

12. The computing device of claim 6, wherein the secure memory comprises a non-volatile memory.

13. A method of verifying integrity of a boot program for a computing device, the method comprising:
 performing, by a boot controller, operations comprising:
 receiving a power-on-reset signal;
 generating a check log by verifying the integrity of the boot program based on an expected value previously stored in a secure memory, the verifying of the integrity of the boot program comprising comparing the expected value previously stored in the secure memory with hash values of code stored in a plurality of types of memories; and
 outputting a core reset signal configured to wake up a processor core and a boot mode value determined based on the check log.

14. The method of claim 13, wherein the expected value comprises a first expected value, the check log comprises a first check log, and the generating of the check log comprises:
 generating the first check log by comparing the first expected value previously stored in the secure memory with a hash value of boot code of the boot program stored in read only memory (ROM).

15. The method of claim 14, wherein the expected value comprises a second expected value, the check log comprises a second check log, and the generating of the check log comprises:
 generating the second check log by comparing the second expected value previously stored in the secure memory with a hash value of code stored in a tightly coupled memory (TCM), wherein the code stored in the TCM comprises at least a portion of the boot code stored in the ROM that was copied to the TCM.

16. The method of claim 13, wherein the expected value comprises a third expected value, the check log comprises a third check log, and the generating of the check log comprises:
 generating the third check log by comparing the third expected value previously stored in the secure memory with a hash value of a boot loader of the boot program temporarily stored in random access memory (RAM).

17. A secure boot method for a computing device, the secure boot method comprising:
 receiving a power-on-reset signal at a boot controller of the computing device;
 generating, by the boot controller, a check log by verifying integrity of a boot program based on an expected value previously stored in a secure memory, the verifying of the integrity of the boot program comprising comparing the expected value previously stored in the secure memory with hash values of code stored in a plurality of types of memories;
 outputting, from the boot controller, a core reset signal configured to wake up a processor core of the computing device and a boot mode value determined based on the check log;
 waking up the processor core responsive to the core reset signal; and
 booting the computing device based on the boot mode value by the processor core.

18. The secure boot method of claim 17, wherein the expected value comprises a first expected value, the check log comprises a first check log, and the generating of the check log comprises:
 generating the first check log by comparing the first expected value previously stored in the secure memory with a hash value of boot code of the boot program stored in read only memory (ROM).

19. The secure boot method of claim 18, wherein the expected value comprises a second expected value, the check log comprises a second check log, and the generating of the check log comprises:
 generating the second check log by comparing the second expected value previously stored in the secure memory with a hash value of code stored in a tightly coupled memory (TCM), and
 wherein the code stored in the TCM comprises at least a portion of the boot code stored in the ROM that was copied to the TCM.

20. The secure boot method of claim 17, wherein the expected value comprises a third expected value, the check log comprises a third check log, and the generating the check log comprises:
 generating the third check log by comparing the third expected value previously stored in the secure memory with a hash value of a boot loader of the boot program temporarily stored in random access memory (RAM).

* * * * *